O. C. HOUGHTON.
COTTON PICKER.
APPLICATION FILED SEPT. 20, 1911.

1,074,622.

Patented Oct. 7, 1913.
7 SHEETS—SHEET 1.

Witnesses:
E. B. Knudsen
A. S. Peterson

Inventor:
ORLEY C. HOUGHTON
By Michael J. Stark & Sons,
Attorneys

O. C. HOUGHTON.
COTTON PICKER.
APPLICATION FILED SEPT. 20, 1911.

1,074,622.

Patented Oct. 7, 1913.
7 SHEETS—SHEET 2.

Witnesses:
C. B. Knudsen
A. G. Peterson

Inventor:
ORLEY C. HOUGHTON,
By Michael J. Stark & Sons,
Attorneys

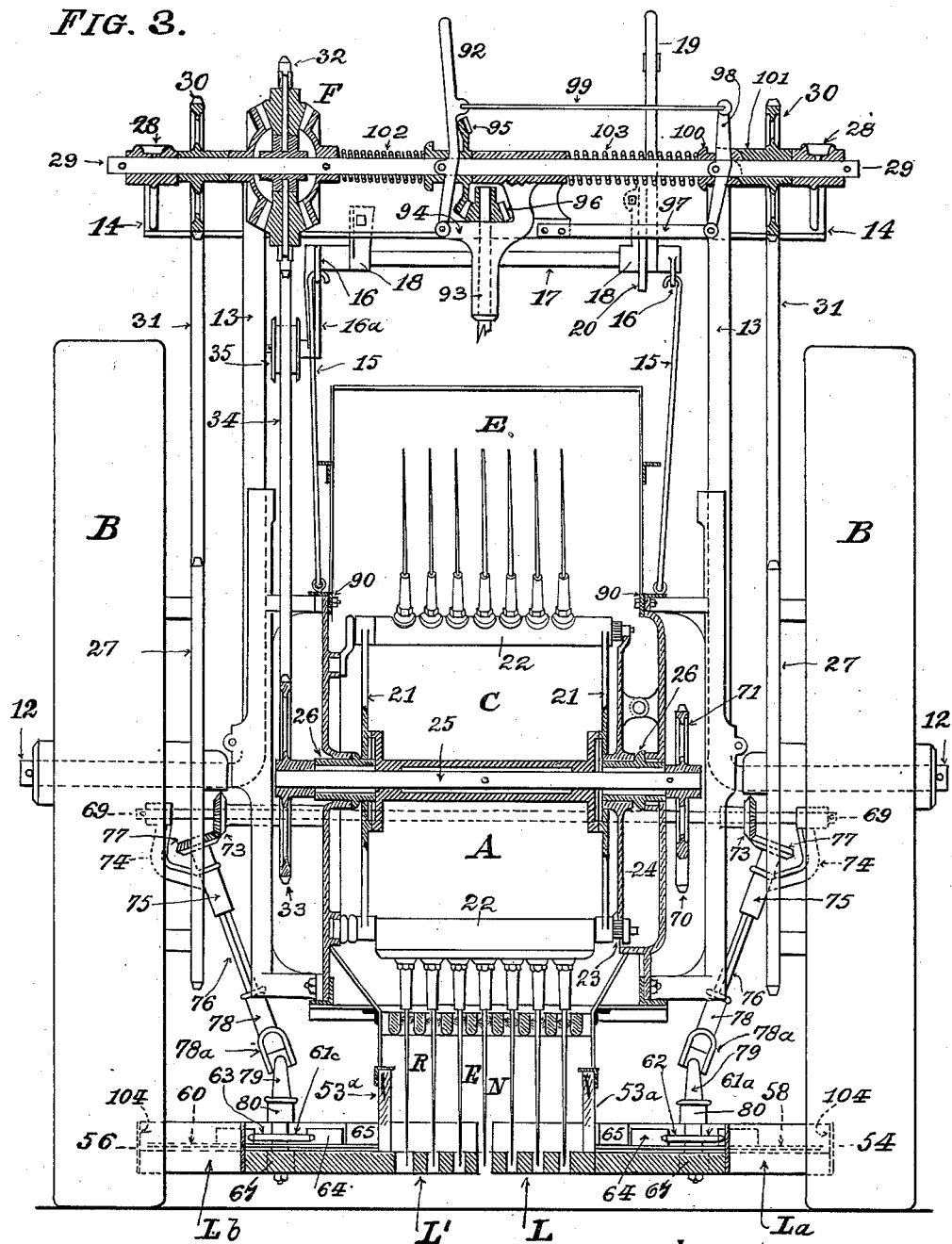

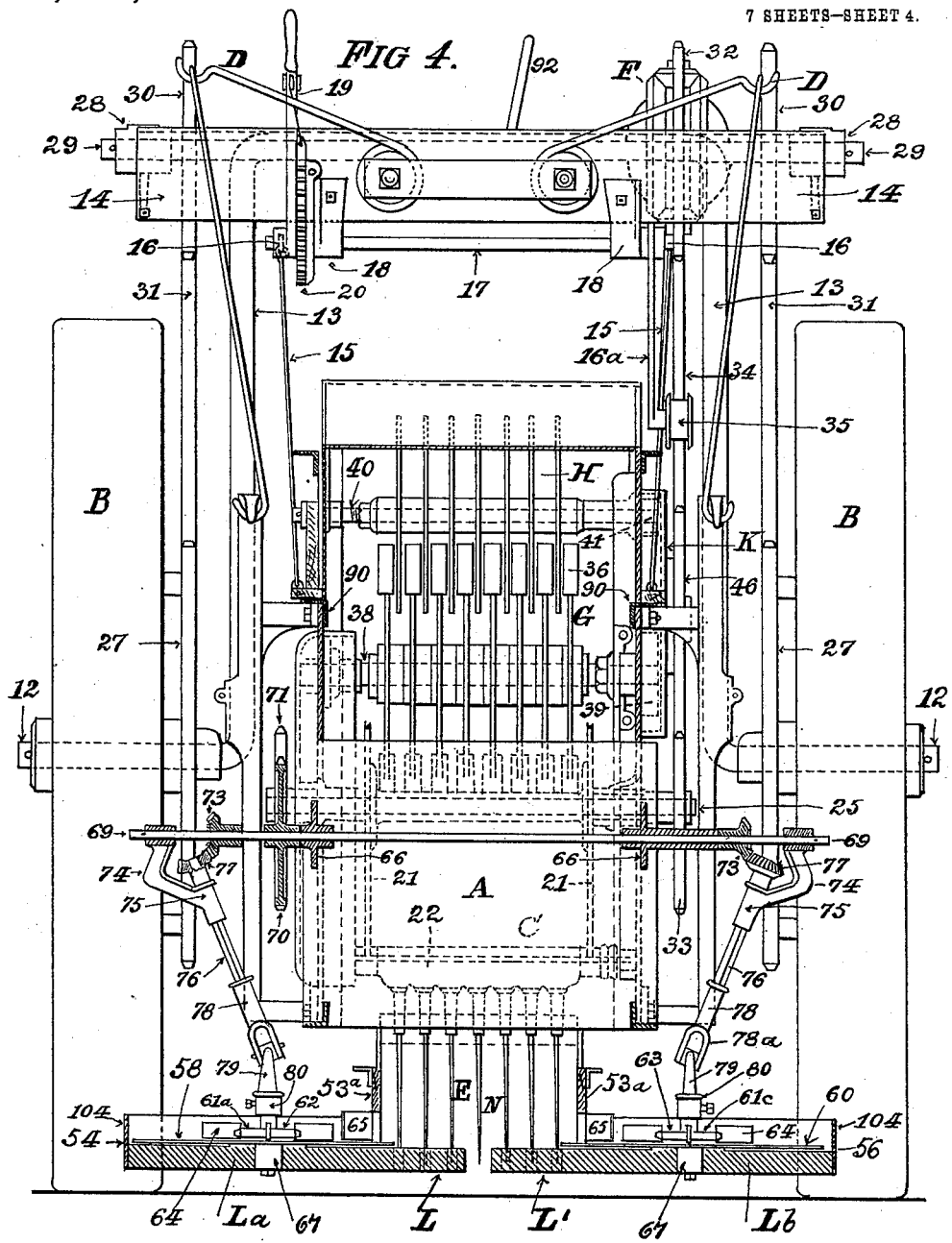

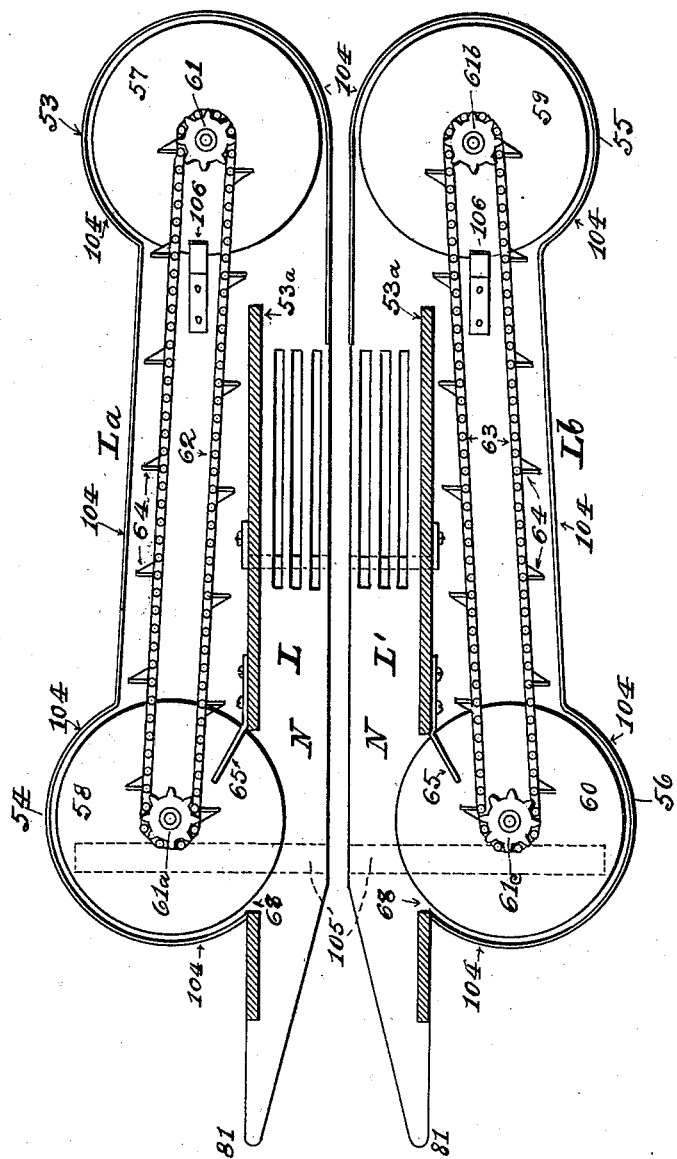

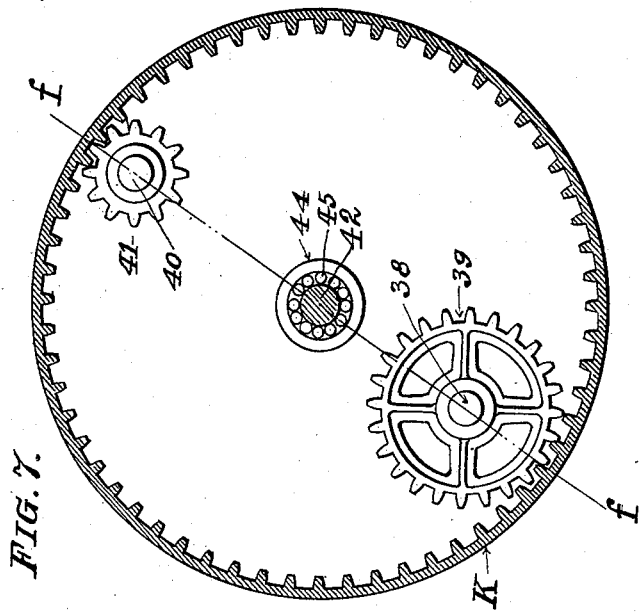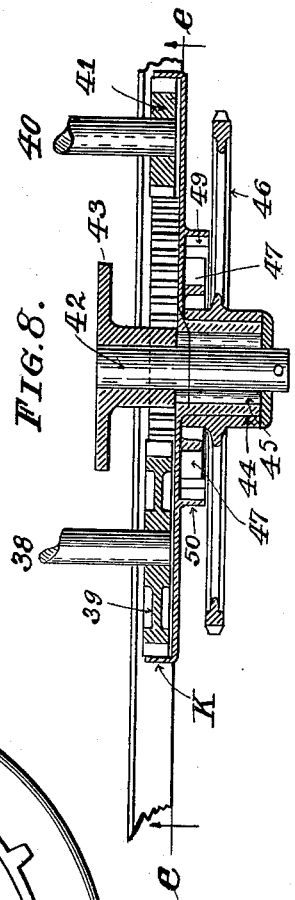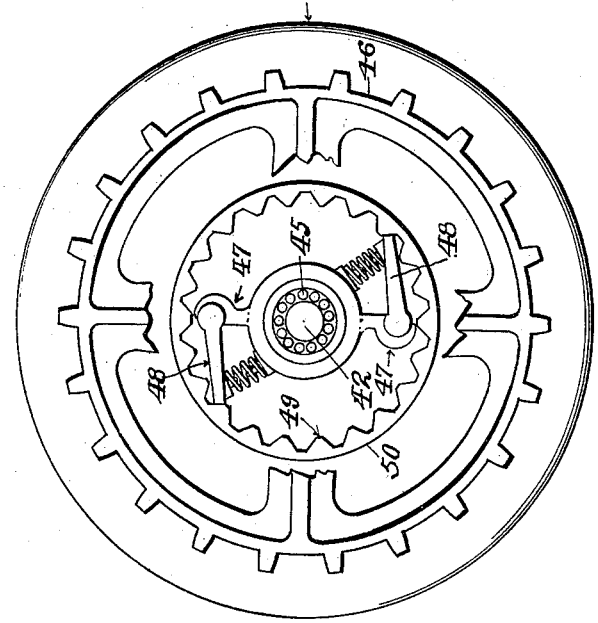

O. C. HOUGHTON.
COTTON PICKER.
APPLICATION FILED SEPT. 20, 1911.
1,074,622.
Patented Oct. 7, 1913.
7 SHEETS—SHEET 7.
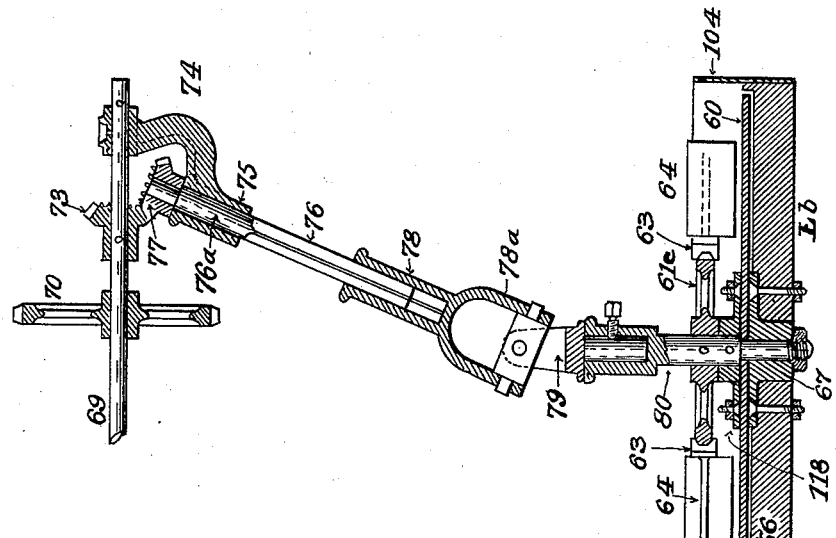
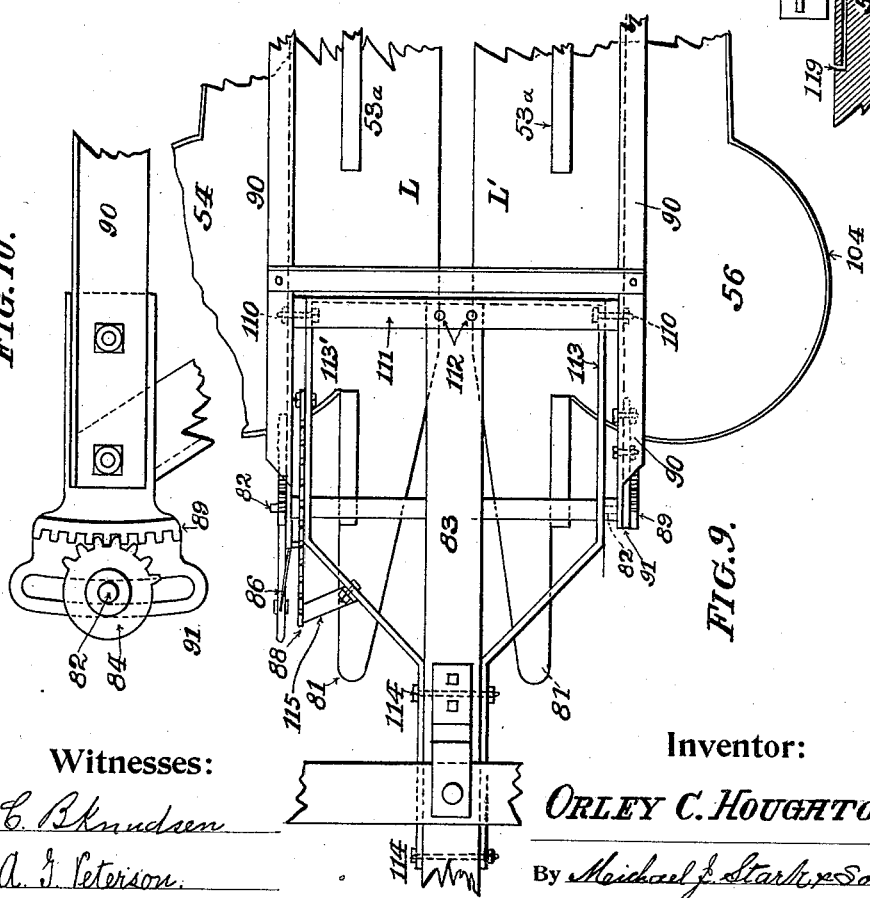
Witnesses:
E. Bknudsen
A. I. Peterson.
Inventor:
ORLEY C. HOUGHTON.
By Michael J. Stark & Sons,
Attorneys

UNITED STATES PATENT OFFICE.

ORLEY C. HOUGHTON, OF CHICAGO, ILLINOIS, ASSIGNOR TO HENRY E. AND JAMES E. BULLOCK, OF CHICAGO, ILLINOIS.

COTTON-PICKER.

1,074,622.	Specification of Letters Patent.	Patented Oct. 7, 1913.

Application filed September 20, 1911. Serial No. 650,396.

*To all whom it may concern:*

Be it known that I, ORLEY C. HOUGHTON, a citizen of the United States, and a resident of Chicago, in the county of Cook, in the State of Illinois, have invented certain new and useful Improvements in Cotton-Pickers; and I do hereby declare that the following description of my said invention, taken in connection with the accompanying sheets of drawings, forms a full, clear, and exact specification, which will enable others skilled in the art to which it appertains to make and use the same.

This invention has general reference to improvements in cotton harvesters; and it consists, essentially, in the novel and peculiar combination of parts, and details of construction, as hereinafter first fully set forth and described, and then pointed out in the claims.

The object of this invention is the production of a cotton harvester that shall be more efficient in operation than those heretofore constructed; that shall be more simple in construction, the improvements being more particularly directed to the driving mechanism of the picking apparatus; to means for raising and lowering the forward end of the machine body to follow the undulations of the ground and thereby to reach under the lower branches of cotton plants to conduct them into, and through the machine body; to novel means whereby cotton that has dropped from the picking spindles, or has dropped from the limbs and branches of the cotton plants while entering and passing through the machine body, may be collected and conveyed to the forward end of the machine to be picked up by the picking spindles, and to ready and quick-acting means for instantly stopping the rotating parts of the entire picking mechanism when necessary or desired.

Figure 1:
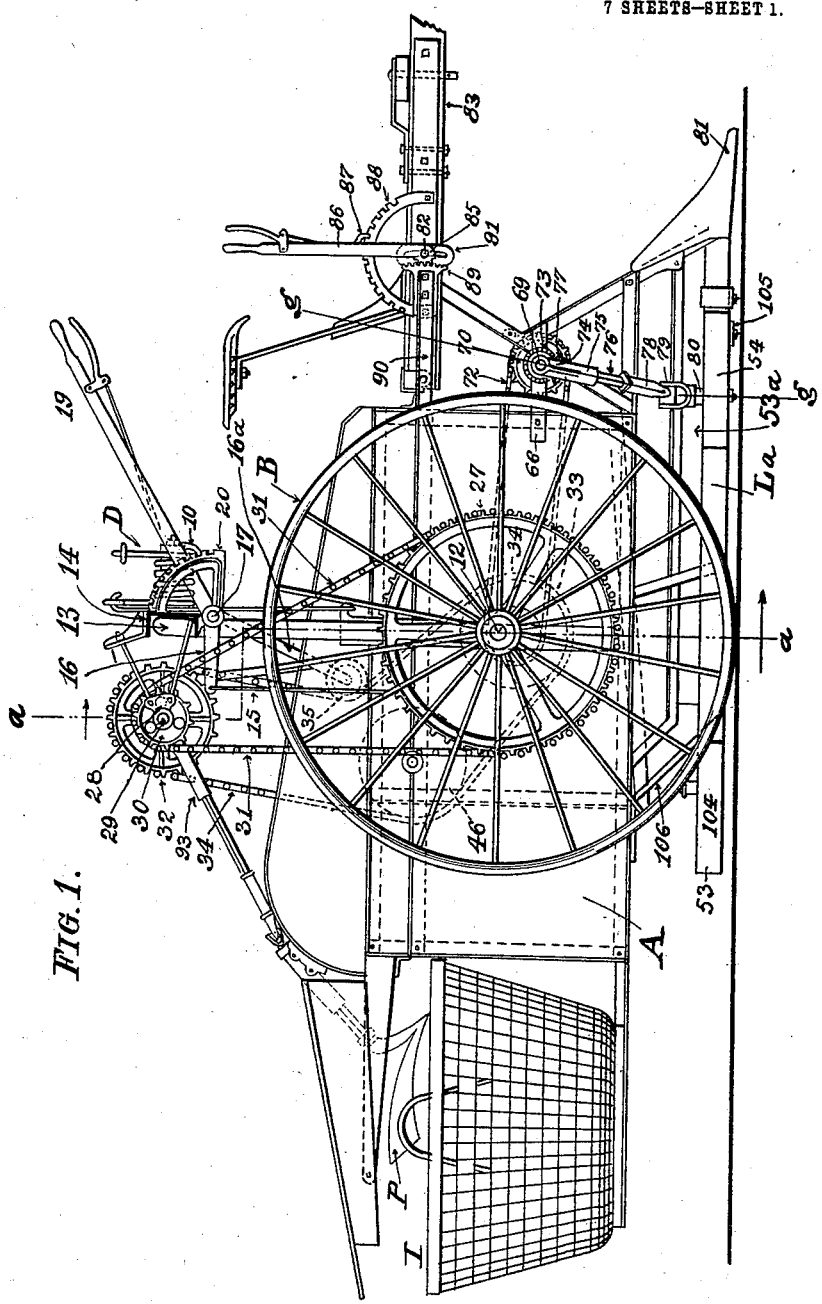
Figure 2:
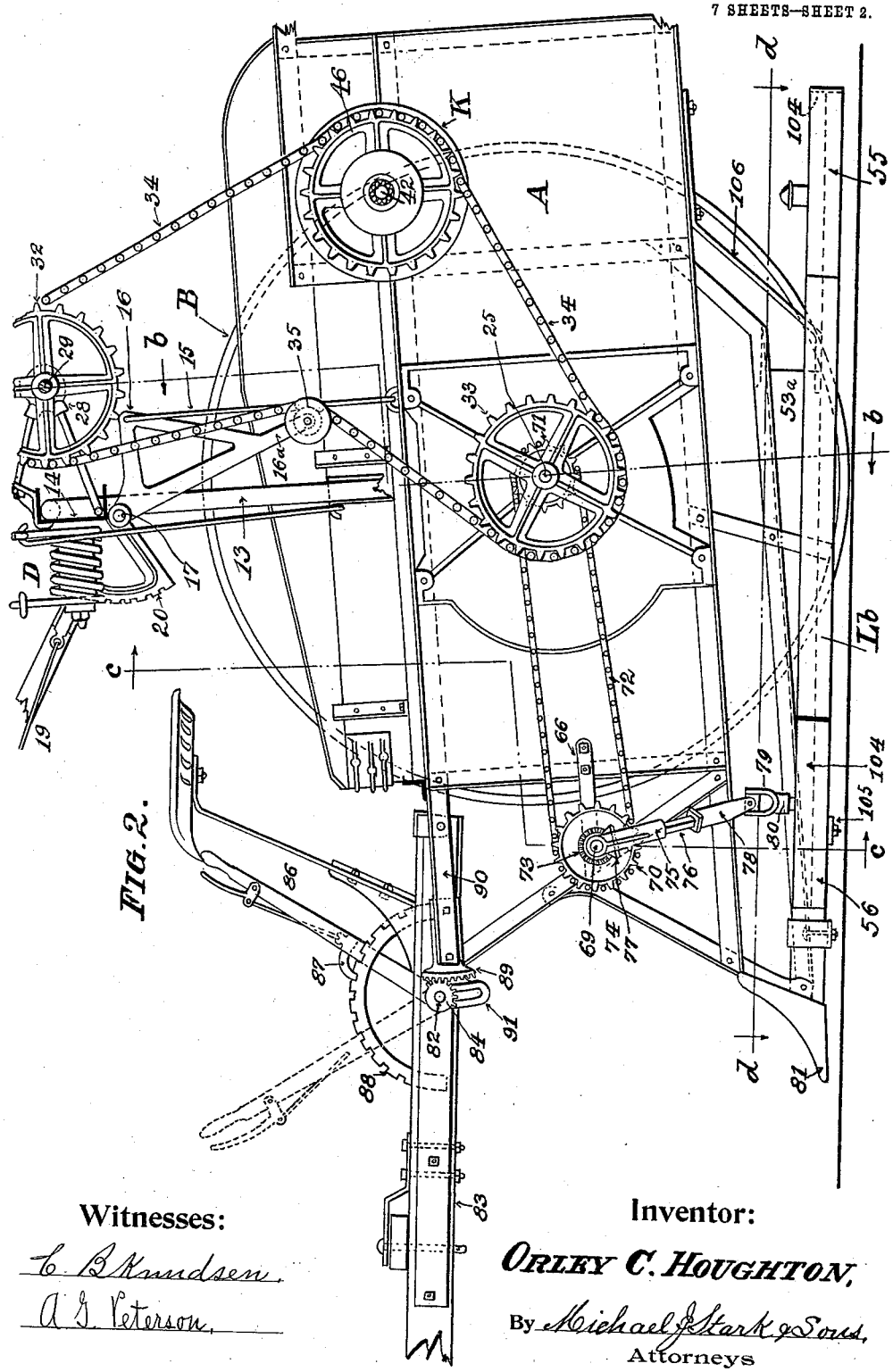

In the drawings already referred to, which serve to illustrate this invention very fully, and which form a part of this specification, Figure 1 is an elevation of the right hand side of this machine, minor and unimportant details of construction being omitted. Fig. 2 is a like view, on a slightly larger scale, of the left hand side of the machine, the rear portion thereof carrying the packer and the receiving basket, and the traction wheel on the left hand side being omitted. Fig. 3 is a transverse sectional elevation taken on line *a—a* of Fig. 1 and also on line *b—b* of Fig. 2, looking toward the forward end of the machine. Fig. 4 is a like view taken on line *c—c* of Fig. 2, looking toward the rear end of the machine. Fig. 5 is a sectional plan taken on line *d—d* of Fig. 2, only details of construction having reference to the conveyer, being shown therein. Fig. 6 is a view of the driving mechanism for the stripper and the cleaner, the hub and portions of the spokes of the driven-sprocket wheel being broken away to disclose the underlying clutch mechanism connected therewith. Fig. 7 is a sectional view on line *e—e* of Fig. 8; and Fig. 8 is a sectional view of the internal spur gear wheel and showing the driven pinions which rotate the stripper and the cleaner, the section being on line *f—f* of Fig. 7. Fig. 9 is a plan of the forward portion of the machine taken from above the upper angle-bar, and especially illustrating the mechanism for raising and lowering the forward end of said machine body, details not directly connected with this mechanism being omitted. Fig. 10 is a side elevation of the left-hand forward end of the upper angle bar and the tilting-iron and toothed rack formed thereon. Fig. 11 is a sectional elevation on line *g—g* of Fig. 1, of one of the mechanisms that rotate the scrapers and disks located on the side extensions of the underlying shelves.

Like parts are designated by the same characters and symbols of reference in all the figures.

The type of machines to which my inventions are applied, is generally known as cotton pickers having rotating picker stems; and it is especially directed to the class of cotton pickers in which the picking spindles travel bodily in vertical planes parallel to the movement of the machine, the picking spindles being constructed to rotate axially, only during a portion of their travel in said vertical planes, there being a dwell in the axial revolution of the picking spindles during the time that they reach, and pass through the spaces between the stripping wheels, to enable these wheels to remove the cotton from the picking spindles, it being a fact that, as long as these spindles revolve axially in the direction in which they have gathered the cotton, the latter adheres closely to the spindles and cannot be removed except by either rotating the spindles axially in the opposite direction in which the cotton is twisted thereon, or at least arresting the axial revolution for the time being.

Briefly described, this machine comprises a machine body, A, movable upon traction wheels B, which revolve loosely upon the spindles, 12, of approximately Z-shaped members 13, one limb of each of which forms said spindles 12, while the other limbs are secured to an overhead cross-beam or channel bar 14, said machine body being suspended from said cross-beam by means of rods 15, connected at their lower ends to said machine body, and at their upper ends to arms 16, fastened to the ends of a shaft 17, having bearings in boxes 18, secured to the cross-beam 14. This shaft 17 is constructed to be rocked by a hand-lever 19, having a catch or dog 10, engaging notches in a quadrant 20, secured to the cross-beam 14, so that by moving this hand-lever 19, forward or backward the machine body A is raised or lowered accordingly, and held in adjusted position by the dog 10, in the well-known manner. To counteract the effect of the weight of the machine body and its appurtenants, a spring suspension device D of known construction is employed to approximately balance the weight of the machine body, and the parts connected thereto.

In the machine body there is located a cylinder, C, so-called, comprising end-plates or disks 21, in which are mounted, in peripheral bearings, a series of columns, 22, only two of which are shown in Fig. 3, there being journaled in each column, and projecting therefrom, a series of picking spindles E, which are axially rotated by pinions 23, Fig. 3, engaging a fixed, mutilated gear wheel 24. This cylinder is mounted upon a shaft 25 having bearings 26, located in the side walls of the machine body; and it is rotated by mechanism including the following elements:—To the traction wheels B there are affixed sprocket wheels 27, and from the cross-beam 14 there are supported rearwardly extending bearings 28, in which there is journaled a shaft 29, which has near its ends sprocket wheels 30, that are connected to the sprocket wheels 27 by link belts 31, to rotate this shaft 29 whenever the machine is being propelled. Upon this shaft 29 there is also mounted a set of differential gearing F, of the well known type, to rotatively connect the sprocket wheel number 32 of said gearing F to said shaft 29. At one end of the cylinder shaft 25, there is affixed, outside of the machine body, a sprocket wheel 33, which connects with the sprocket wheel 32 by a link belt 34 to rotate the cylinder C; but, since the distance between the axial centers of the cylinder shaft 25, and the overhead shaft 29 will vary when the machine body is raised or lowered by the hand-lever 19, there is formed on one of the arms 16 that effect the raising and lowering of the machine body A, an arm 16ª, to the end of which is journaled a roller 35, which will give, and take up, slack to the chain or link belt 34, as the case may be, in order to accommodate the respective position of the machine body A.

In the machine body, and at the rear of the cylinder, there is located a stripper G, Fig. 4, which comprises a series of wheels having paddles 36, one type of such wheels being shown and fully described in Letters Patent of the United States, granted to me January 24, 1911, No. 982,676, to which reference may be had for a full disclosure of the construction and operation of this stripper mechanism; and in the rear of this stripper there is located a cleaning device H, including a series of star wheels, which removes the picked cotton from the stripper and conveys it, or forces it to be conducted, to a receptacle I, located in the rear of the machine. Heretofore these two devices, viz., the stripper and the cleaner, have been driven by means of a train of gear wheels, an example of which may be seen in Fig. 6, of the Letters Patent granted to me March 7, 1911, No. 986,059, for cotton harvester. This construction of the driving mechanism is not entirely satisfactory. The number of gear wheels employed, and the noise made by them when running, is objectionable; and to overcome this objection and to simplify the construction, and to enable me to avoid other objections to which reference will be hereinafter had, I connect the gear wheel 39 on the stripper shaft 38, and the gear wheel 41 on the cleaner shaft to an internal gear wheel K, mounted upon a stub shaft 42, secured to a bracket 43, located in the machine body. This gear wheel K is provided with a central hub, 44, larger, in internal diameter than the stub shaft 42, to receive anti-friction rollers 45. Upon this hub 44 there is rotatively mounted a sprocket wheel 46 around which the link belt 34 is trained. On this sprocket wheel hub 44 there are formed bearing members 47, to receive dogs 48, with their journal ends; the opposite ends of said dogs being free to engage the serrated inner circumference 49, of a ring 50, formed on the face of the gear wheel K in such manner that, when the sprocket wheel 46 rotates in one direction the dogs 48 engage the internal gear wheel by the serrated ring 50 formed thereon; while, when the sprocket wheel 46 rotates in the opposite direction, the dogs 48 will slip over the teeth or serrations 49, and will not engage or rotate the internal gear wheel K. This feature of the drive for the stripper and the cleaner is an important one for the reason that the breaking of parts of the rotating mechanism has been almost entirely obviated; thus, where the positive driving gear is employed, and the machine is suddenly stopped, the momentum of the rotating stripper and the cleaner is such that they cannot be suddenly stopped without damage to some part, and hence, the breaking of the gear wheels, or a number of teeth in these gear wheels, is a frequent occurrence.

It will now be observed that by training the link belt which rotates the cylinder in such manner that said link belt also rotates the internal gear wheel, the strippers and cleaners may continue to rotate until their momentum is exhausted after the cylinder has ceased to revolve, thereby avoiding the jar and breakages heretofore mentioned, and that by this method of rotating the picking, the stripping, and the cleaning mechanisms, the construction has been materially simplified and the number of parts reduced to a considerable extent.

In the class of cotton picking machines described, there is some loss of cotton which, on account of the shaking which the cotton plants receive when the machine is passing over the same, drops to the ground, or which drops upon the underlying shelves or guards L, L', and is swept therefrom by the branches and limbs of the cotton plants. To prevent this loss of cotton, it has been proposed to make these shelves or guards pan-shaped; but, the results obtained are not fully satisfactory. I, therefore, construct these guards as shown in the drawings, and especially so in Fig. 5, with side extensions $L^a$—$L^b$, projecting laterally beyond the skirts $53^a$ that form part of the channel N below the machine body. These side extensions have forward, and rear-end, curved portions 53, 54, 55 and 56, respectively; and upon these curved portions are located circular disks 57, 58, 59 and 60, which lie close upon the upper surfaces of said guard extensions, and which may be sunk flush with the same, said disks being rotatively mounted upon shafts 80, having suitable bearings 67, fastened to the said shelf extensions. To these disks are secured sprocket wheels 61, $61^a$, $61^b$ and $61^c$, of which the sprocket wheels 61, $61^a$ are connected by a drive chain 62, while the sprocket wheels $61^b$ and $61^c$ are connected by a drive chain 63. These drive chains or link belts have scrapers 64, at spaced intervals, which scrapers sweep over the upper surfaces of the side extensions; said rotating disks 57, 58, 59 and 60 extending into the channel N, there being openings, 68, in the skirts $53^a$ at their forward ends to permit these disks to occupy a portion of said channel, said openings being high enough to pass cotton therethrough.

To these skirts, and reaching over the forward disks for some distance, there are attached, vertically arranged, intercepting plates 65, the object of which will be hereinafter described.

The forward pair of sprocket wheels $61^a$, $61^c$ are rotated by mechanism comprising the following elements:—To the forward end of the machine body, and projecting forwardly therefrom, there are provided bearing-brackets 66, in which is journaled a transverse shaft 69; and upon this shaft there is fastened a sprocket wheel 70, while upon the cylinder shaft 25, there is located a similar sprocket wheel 71. These sprocket wheels may be located on either side of the machine body; and in Fig. 1, I have indicated these sprockets at the left hand side thereof, while in Figs. 2, 3 and 4, I have illustrated the same on the right hand side of the machine body. They are connected by a link belt 72.

Near the outer ends of the forwardly located transverse shaft 69, there are secured bevel pinions 73, and at the outer ends of this shaft are loosely mounted brackets 74, said brackets having long bearing sleeves 75, in which are rotatively mounted, inclined shafts 76, which carry at their upper ends bevel pinions 77, that mesh with the bevel wheels 73, already mentioned. The shafts 76 are squared below the long sleeves 75, and enter angular sockets 78, the lower ends of which are bifurcated at $78^a$ to form, with bifurcated members 79, on the shaft 80, to which the sprocket wheels $61^a$ and $61^c$ are attached, universal joints of a well known type. The squared portions of the inclined shafts 76 are constructed to slide longitudinally in the sockets 78 to compensate for any variation in the distance between the shelves and the machine body, caused by slight differences in the construction of the machine body, as will be hereinafter described.

In cotton picking machines of the type mentioned, and as hereinbefore described, the machine body may be bodily raised and lowered by the hand lever 19, to allow the picking spindles to be raised and lowered to follow undulations of the ground, or to be raised high enough to pass over stones or other obstructions in the field, and in moving the machine to and from the field. While the means for raising the machine body bodily operate properly for the purpose described, the same does not afford means for raising and lowering the forward end of the machine body so that the scoops or pick-ups 81, at the forward end may be lowered and raised as occasion requires to pass under branches and limbs of the cotton plants that lie upon the ground and conduct them into the channel N. The means for raising and lowering this forward end of the machine body comprise a shaft 82, which passes through, and projects from both sides of, the pole 83. At one end, this shaft carries a segment of a pinion 84, Fig. 2, and at the other end, shaft 82 carries a corresponding segment of a pinion 85, Fig. 1, which latter pinion is preferably formed integral with a hand lever 86, which has a dog 87 constructed to engage notches in a substantially semi-circular rack 88, also secured to the said pole 83. These two segmental pinions 84, 85, engage segmental racks 89, secured near the forward ends of the upper angle bar 90 of the machine body, in close proximity to the tilting iron 91, secured to the forward end of said angle bars, through the curved slot holes of which the shaft 82 passes and thereby limits the up and down movement of the forward end of the machine body.

In the machine described, provisions are made to readily and rapidly arrest the rotative movements of all the parts of the machine should such sudden stoppage be necessary, as in the bending or breaking of a picking spindle or disarrangement of other machine part or for turning the machine at the ends of the rows of cotton plants. This mechanism includes a hand lever 92, pivotally connected to an arm 94, formed on a downwardly and rearwardly extending bracket 93, Figs. 1 and 3, journaled medially upon the overhead shaft 29, already described. This hand lever connects, in any suitable and effective manner, to a bevel wheel 95, meshing with a bevel pinion 96, by which the packer P, Fig. 1, is rotated, to move the bevel wheel 95, into and out of engagement with the bevel pinion 96, to start and stop the rotation of said packer. The details of construction of this packer are well known and need not here be specifically described.

To the above mentioned bracket 93 there is secured a rod 97, to the end of which is pivoted one end of a lever 98, which connects at its other end, with the hand lever 92, by a rod 99. This lever 98 engages approximately medially, one member, 100, of a claw, or knuckle clutch; the other, opposite, and co-acting part of which is formed on the hub 101, of the sprocket wheel 30, by which the shaft 29 is rotated. By moving this hand lever in one direction the clutch member 100 is moved out of engagement with its companion member, at the same time that the bevel wheel 95 is moved out of engagement with its coacting pinion 96, thereby arresting the movement of all the rotating parts of the picking mechanism, except the two sprockets 30, which will continue to rotate as long as the machine is moving. This clutch member 100 and the bevel gear wheel 95 are normally held in engagement, with their co-acting parts, by spiral springs 102, 103, in an obvious manner.

In describing the operation of the machine as far as the same has not already been disclosed, it will suffice to say that when the machine is moved over a row of cotton plants, these plants enter the channel (which is formed by the two skirts 53ª, the underlying shelves L, L' and a grate R, through which the picking spindles enter the channel N) and meet the rotating picking spindles which pick the cotton from the plants, in the well known manner. Any cotton that lies, is picked up by the pick-ups 81, or drops upon, these underlying shelves, is carried backward thereupon, and deposited upon the rather swiftly rotating rear disks 57, 59, the centrifugal movement of which causes this cotton to be thrown toward the outer margins thereof, where the scrapers 64, on the endless link belts 63, will carry this cotton toward the forward end of the shelves upon the forward, swiftly rotating disks 58, 60, and these, in turn, will throw this cotton back into the channel N; the intercepting plates 65, at the mouths or openings 68, preventing any cotton from being carried backward by the scrapers 64, in their return passage. In this manner the cotton that has not been picked up by the picking spindles, but has dropped upon the underlying shelves, is moved to the forward end of the channel N and again, (and may be repeatedly) presented to the action of the picking fingers until finally picked up by the same. By the introduction of this cotton-returning device, as it may be properly termed, I am enabled to save nearly, if not quite all, the loose cotton that the machine has heretofore failed to pick up, and, as a matter of fact, this machine, by the aid of the mechanism for raising and lowering the forward end of the machine by the hand lever 86, can be successfully used as a gleaner in the cotton field, after the machine-picking is practically completed. And in order to prevent cotton upon the underlying shelves from falling off, these shelves are provided with upwardly extending marginal guards 104, of sufficient height to accomplish the desired result.

To support the underlying shelves and connect them to the machine body, any suitable means may be provided and may include cross rods 105 near the forward ends of the said shelves and suspending rods 106, near the rear ends thereof.

I have hereinbefore stated that the semi-circular rack at the forward end of the machine, which forms part of the mechanism for raising and lowering the forward end of the machine, is secured to the pole 83. This, however, is only indirectly so, and the exact construction is shown in detail in Fig. 9. This pole is pivoted at its inner end by pivotal bolts 110, which pass through the end walls of an angle-iron bar 111, and the vertical leg of the upper angle bar 90; the pole being fastened to this angle iron bar 111, by suitable means 112. Adjacent to these upper angle bars 90, there are fastened at one of their ends angularly bent brace rods 113, 113', the other ends being bolted to the pole at 114. The shaft 82 already mentioned passes through the pole at a distance from its pivotal point. To the brace rod 113' the semicircular, notched, rack is fastened at one end, its other end being secured to the same brace rod at its angular portion, by a supporting bar 115. It will thus be noticed that while this rack 88 is indirectly connected to the pole 83, its connection with the pole is a rigid one.

The details of construction of the driving mechanisms for the rotating disks on the extensions of the guard, are best illustrated in Fig. 11, wherein the upper cylindrical portion of the shaft 76, indicated by 76ª, is clearly shown. In the preferred embodiment of this invention, the forward disks, of which the left-hand one, 60, is illustrated, have a flanged hub 118, fastened to the shaft 80, and to this flange 118 the said disk is secured in a substantial manner. In this Fig. 11, the disk 60 is shown located in a recess or depression 119, so that the upper surface of the disk 60 is flush or even with the upper surface of the side extension L^b, of the underlying shelf. It is evident that the construction disclosed in Fig. 11 applies also to the right hand mechanism of the driving gearing for the disks and the scrapers.

I have already stated a reason for constructing the shaft 76 with its angular portion engaging the correspondingly-shaped socket 78, which is to compensate for any variation in the construction of the machine body, which varies in width: some machines being constructed with seven picking spindles in each column, while others have eight, and even ten of these spindles in each column, and, therefore, require different widths of machine bodies, while the mechanism for driving the disks is applicable to all the various sizes. A further reason for this construction is that a rigid connection between the transverse shaft 69, and the disks 58, 60, is not desirable owing to the jars and vibrations of the machine when in operation; and finally, this construction permits of ready assembling and dismounting when desired or required.

I have heretofore described, and in the drawings I have illustrated means for raising and lowering the forward end of the machine body. These means I do not claim in the present application since they form the subject matter of a divisional application filed by me on the 10th day of June, 1912, Serial No. 702,793.

Having thus fully described this invention, I claim as new and desire to secure to me by Letters Patent of the United States—

1. A cotton harvester, including, in combination, a machine body mounted on wheels, cotton picking mechanism in said machine body, means for operating said cotton picking mechanism, and a guard below said machine body, said guard being constructed to lift branches of cotton plants from the ground and support the same in said machine body while the cotton picking mechanism is operating in said plants to pick cotton therefrom, said guard underlying the cotton picking mechanism in front and in the rear thereof, a conveyer constructed to conduct cotton carried upon the rear portion of said guard forwardly to that portion of said guard which is in front of the cotton picking mechanism to present said cotton to the action of said cotton picking mechanism, and means for operating said conveying mechanism.

2. A cotton harvester, including, in combination, a machine body mounted on wheels, cotton picking mechanism in said machine body, means for operating said cotton picking mechanism, and a guard below said machine body and connected thereto, said guard being constructed to lift branches of cotton plants from the ground and support the same in said machine body while the cotton picking mechanism is operating to pick cotton therefrom, said guard comprising two shelves underlying the cotton picking mechanism in front and in the rear thereof, conveying mechanism constructed to conduct cotton carried upon that portion of each shelf which is in the rear of the cotton picking mechanism forwardly and in front of said cotton picking mechanism to present said cotton to the action of said cotton picking mechanism, and means for operating said conveying mechanism.

3. A cotton harvester, including, in combination, a machine body mounted on wheels, cotton picking mechanism in said machine body, means for operating said cotton picking mechanism, and a guard, said guard being constructed to lift branches of cotton plants from the ground and support the same in said machine body while the cotton picking mechanism is operating in said plants to pick cotton therefrom, said guard extending from in front of said cotton picking mechanism to and beyond the rear thereof, said guard having a main portion located in said machine body and side extensions projecting laterally therefrom, there being upon said side extensions conveying mechanism constructed to transport cotton carried upon the rear end of said guard forwardly past the sides of said machine body to the forward end of said guard to present said cotton to the action of said cotton picking mechanism, and means for operating said conveying mechanism.

4. A cotton harvester, including, in combination, a machine body mounted on wheels, cotton picking mechanism in said machine body, means for operating said cotton picking mechanism, and a guard connected to said machine body, said guard being constructed to lift branches of cotton plants from the ground and support the same in said machine body while the cotton picking mechanism is operating to pick cotton from the said plants, said guard extending from in front of said cotton picking mechanism to and beyond the rear thereof, said guard comprising two main portions located in said machine body in spaced relation, each main portion having a side extension projecting laterally from the side of said machine body, there being upon each side extension conveying mechanism constructed to transport cotton carried upon the rear end of its main portion forwardly past the side of said machine body to the forward end of each main portion of said guard to present said cotton to the action of said cotton picking mechanism, and means for operating said conveying mechanisms.

5. A cotton harvester, including, in combination, a machine body mounted on traction wheels, cotton picking mechanism in said machine body, means for operating said cotton picking mechanism said means being connected to said traction wheels, and a guard below said machine body, said guard being constructed to lift branches of cotton plants from the ground and support the same in said machine body while the cotton picking mechanism is operating in said plants to pick cotton therefrom, said guard having a main portion located in said machine body and extending from in front of said cotton picking mechanism, to and beyond the rear thereof, said guard having side extensions, projecting laterally therefrom, there being upon said side extensions conveying mechanism constructed to transport cotton carried upon the rear end of said guard forwardly to the front end thereof into said machine body, to present said cotton to the action of the cotton picking mechanism, and means for operating said conveying mechanism, the latter means being connected to said cotton picking mechanism and operating simultaneously therewith.

6. A cotton harvester, including, in combination, a machine body mounted on traction wheels, cotton picking mechanism in said machine body, means for operating said cotton picking mechanism said means being connected to said traction wheels, and a guard below said machine body and connected thereto, said guard being constructed to lift branches of cotton plants from the ground and support the same in said machine body while the cotton picking mechanism is operating to pick cotton therefrom, said guard extending from in front of said cotton picking mechanism to and beyond the rear thereof, said guard comprising two members in said machine body in spaced relation, each member having a main portion and a side extension, projecting laterally therefrom, there being on each side extension conveying mechanism constructed to transport cotton carried upon the rear end of said main portion forwardly to the forward end of, and into said machine body, to present said cotton to the action of said cotton picking mechanism, and means for operating said conveyers, the latter means being connected to said cotton picking mechanism and operating simultaneously therewith.

7. A cotton harvester, including, in combination, a machine body mounted on wheels, cotton picking mechanism in said machine body, means for operating said cotton picking mechanism, and a guard below said machine body and connected thereto, said guard being constructed to lift branches of cotton plants from the ground and support the same in said machine body while the cotton picking mechanism is operating in said plants to pick cotton therefrom, said guard extending from in front of said cotton picking mechanism to and beyond the rear thereof, said guard having a main portion located in said machine body and a side extension, there being at the rear end of said side extension conveying mechanism constructed to conduct cotton from the rear end of said main portion to the rear end of said side extension, further conveying mechanism on said side extension to conduct cotton from the rear end of said side extension to the forward end thereof, conveying mechanism at the forward end of said side extension constructed to convey cotton from the forward end of said side extension to the forward end of said main portion into said machine body, whereby cotton carried upon the main portion of the guard in the rear of said cotton picking mechanism is conducted in front thereof to be acted upon by said cotton picking mechanism, and means for operating said conveying mechanism.

8. A cotton harvester, including, in combination, a machine body mounted on wheels, cotton picking mechanism in said machine body, means for operating said cotton picking mechanism, a guard below said machine body and connected thereto, said guard extending from in front of said cotton picking mechanism to and beyond the rear thereof, said guard comprising two members in spaced relation each member having a main portion located in said machine body and a side extension, there being at the rear end of each side extension conveying mechanism constructed to conduct cotton from the rear end of said main portion to the rear end of said side extension, further conveying mechanism on said side extension to conduct cotton from the rear end of said side extension to the forward end thereof, means at the forward end of each side extension constructed to convey cotton from the forward end of said side extension to the forward end of the main portion of said guide in front of said picking mechanism, and mechanism for operating said conveyers conjointly with the cotton picking mechanism.

9. A cotton harvester, including, in combination, a machine body mounted on wheels, cotton picking mechanism located in said machine body, means for operating said cotton picking mechanism, a guard, said guard being constructed to lift branches of cotton plants into said machine body and support the same therein while the cotton picking mechanism is operating in said plants to pick cotton therefrom, said guard extending from in front of said cotton picking mechanism to and beyond the rear thereof, conveying mechanism on said guard constructed to conduct cotton carried upon that portion of said guard which is in the rear of said cotton picking mechanism forwardly to the forward end of said guard to present said cotton to said cotton picking mechanism, said conveying mechanism including rotating disks at the ends of said guard and intermediate scraper belting, and means for operating said conveying mechanism.

10. A cotton harvester, including, in combination, a machine body mounted on wheels, cotton picking mechanism in said machine body, means for operating said cotton picking mechanism, a guard, said guard being constructed to lift branches of cotton plants into said machine body and support the same therein while the cotton picking mechanism is operating in said plants to pick cotton therefrom, said guard extending from in front of said cotton picking mechanism to and beyond the rear thereof, said guard comprising two members in spaced relation, and affording a bottom for said machine body, each member having a main portion and a side extension, conveying mechanism on said extensions constructed to conduct cotton from the rear end of said machine body forwardly over said side extensions to the forward ends thereof and upon the forward end of the main portion of said guard, to present cotton carried upon the rear portions of said guard members to the action of said cotton picking mechanism, and means for operating said conveying mechanism, said conveying mechanism including rotating disks at the ends of said guard and intermediate scraper belting, as specified.

11. In a cotton harvester, a machine body having a channel within which cotton plants are received, cotton picking mechanism in said machine body constructed to operate in said channel, a longitudinally split shelf in said channel underlying said picking mechanism and extending from in front of said picking mechanism to and beyond the rear thereof, a conveyer on said shelf comprising two similar sets of mechanisms located one on each side of said shelf, each of said sets of conveying mechanisms including a rotating disk at the end of said shelf, said disk extending entirely across the rear-end of the respective shelf-section, a like rotating disk at the forward end of said shelf-section, a conveyer-belt connecting said rotating disks, paddles on said conveyer-belt, upstanding guards surrounding said disks and the outer margins of said shelf, and mechanism for operating said conveyer and the cotton picking mechanism conjointly.

12. In a cotton harvester, the combination, of a machine-body mounted on traction wheels, a channel in said machine-body, cotton picking mechanism located in said machine-body operating in said channel, a shelf located in said channel below said cotton picking mechanism, said shelf extending from in front of said cotton picking mechanism to, and beyond the rear thereof, conveying mechanism upon said shelf constructed to convey cotton upon the rear end of said shelf to the forward end thereof, said conveying mechanism including a rotating disk at each end of said shelf and an intermediate conveyer-belt coöperating with said disk, means for rotating said disk from one of the traction wheels of said machine, and means for operating said cotton picking mechanism simultaneously with said conveyer-operating mechanism.

13. In a cotton harvester a machine body mounted on traction wheels, said machine body having a channel within which cotton plants are received, cotton picking mechanism in said machine body, constructed to operate in said channel, a shelf in said channel underlying said cotton picking mechanism, said shelf having side-extension, extending from in front of said cotton picking mechanism to and beyond the rear thereof, a transversely-operating conveyer at the rear end of said shelf, a forwardly moving conveyer upon the side extension of said shelf, a transversely operating conveyer at the forward end of said shelf, said transversely operating conveyer extending over the said shelf and its side-extension and being coöperatively connected to the forwardly moving conveyer, means for operating said cotton picking mechanism, and means for conjointly operating said conveyers simultaneously with the cotton picking mechanism.

14. A cotton harvester, including, in combination, a machine body having a channel within which cotton plants are received, cotton picking mechanism constructed to operate in said channel, a shelf in said channel underlying said cotton picking mechanism, said shelf extending from in front of said picking mechanism to, and beyond the rear thereof, said shelf having a side-extension projecting beyond the side of said channel, a bearing near the rear end of said underlying shelf, a rotatable disk mounted in said bearing, a further bearing near the forward end of said underlying shelf, a rotatable disk mounted upon this forward bearing, the upper surfaces of said disks being approximately level with the upper surface of said shelf, a conveyer-belt connected to said disks, said conveyer belt having paddles or scrapers at spaced intervals, an upstanding guard surrounding a major portion of said underlying shelf, and means for conjointly rotating said disks and said conveyer-belt.

15. In a cotton harvester, the combination with a machine body, having a channel wherein cotton plants are received, cotton picking mechanism constructed to operate in said channel, a shelf in said channel underlying the cotton-picking mechanism and extending from in front of said picking mechanism to and beyond the rear thereof, a rotatable disk at the rear end of said shelf, an upstanding guard surrounding this disk for a part of its periphery, a traveling conveyer at the side of said channel the rear end of which communicates with said rotatable disk, a rotatable disk at the forward end of said shelf communicating with the forward end of said traveling conveyer and with the forward end of said underlying shelf, and means for conjointly operating said conveyers.

16. In a cotton harvester, the combination, of a machine body mounted on wheels, cotton picking mechanism located in said machine body, a channel in said machine body wherein cotton plants are received while the picking mechanism is operating therein to remove cotton from said plant, a shelf in said channel underlying said picking mechanism constructed to conduct cotton that may drop thereon to the rear end of said shelf, a conveyer located transversely at the rear end of said shelf and communicating therewith a further conveyer at the side of said channel which moves in the direction in which the machine is moving, the latter conveyer being in communication with the transversely located rear-end conveyer, and a conveyer at the forward end of said shelf and in communication with the forwardly moving conveyer, said forwardly located conveyer being constructed to operate transversely to the forwardly moving conveyer and communicating with the forward end of said shelf, whereby cotton moving rearwardly upon said shelf is conducted out of said channel back to the forward end of said shelf in front of said picking mechanism, and means for conjointly operating said conveyers and the cotton picking mechanism.

17. In a cotton harvester having shelving underlying the cotton picking mechanism, means for conveying cotton carried upon said shelving in the rear of the cotton picking mechanism to the forward end of said shelving to be acted upon by said picking mechanism, said means including, in combination, a rotatable disk at the rear end of said shelving, a sprocket-wheel secured to the upper surface of said shelving, a rotatable disk at the forward end of said shelving, a sprocket-wheel secured to the upper surface of the latter disk, a conveyer-belt trained over said sprocket-wheels, said conveyer-belt having scrapers extending laterally therefrom, an intercepting plate reaching over a portion of the forwardly located rotatable disk, and mechanism for operating one of said rotatable disks.

In testimony that I claim the foregoing as my invention, I have hereunto set my hand in the presence of two subscribing witnesses.

ORLEY C. HOUGHTON.

Witnesses:
MICHAEL J. STARK,
A. G. PETERSON.

---

Copies of this patent may be obtained for five cents each, by addressing the "Commissioner of Patents, Washington, D. C."